(No Model.) 2 Sheets—Sheet 1.
N. ARAVE.
Baling Press.
No. 242,580. Patented June 7, 1881.
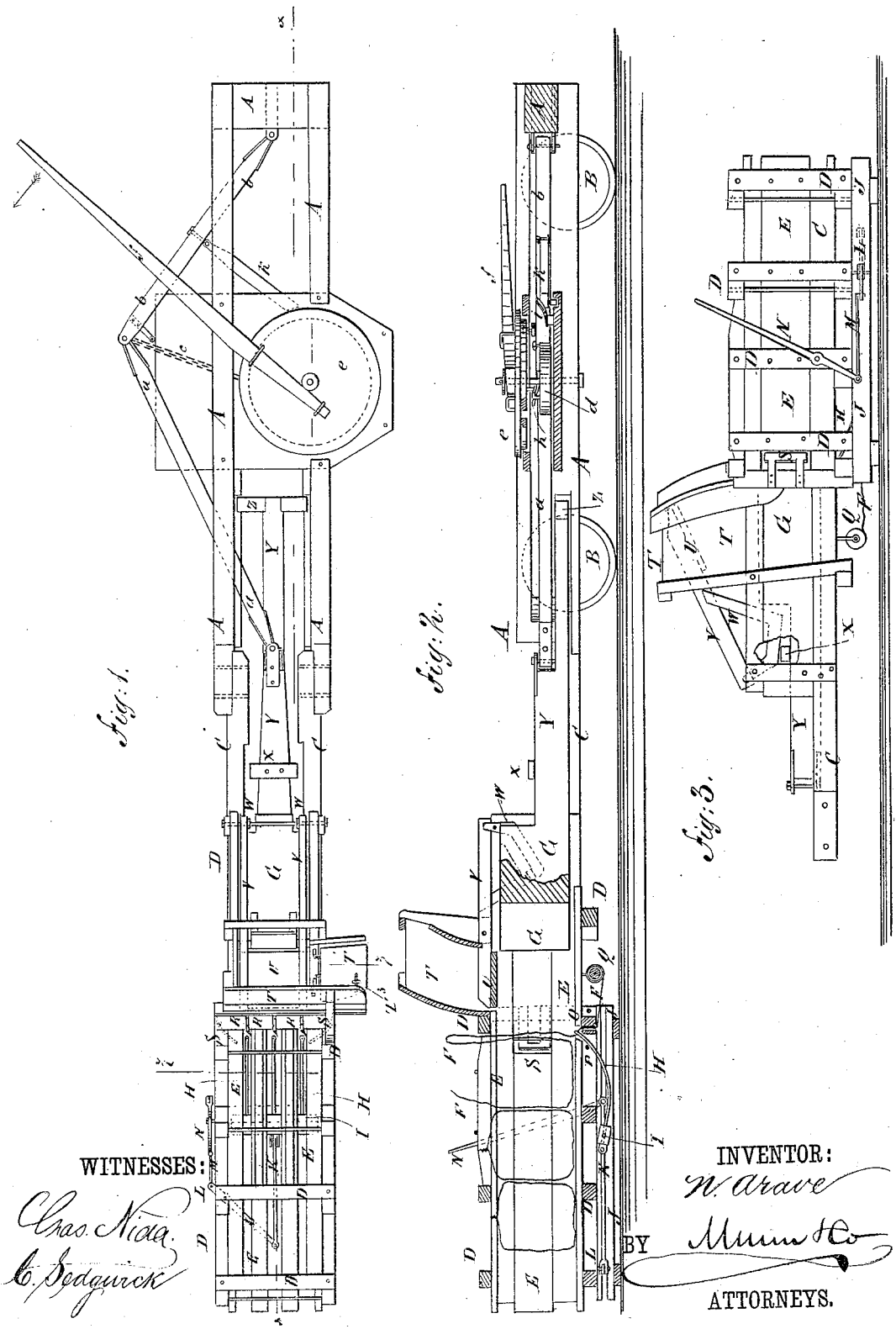
WITNESSES:
Chas. Nida.
C. Sedgwick
INVENTOR:
N. Arave
BY Munn & Co
ATTORNEYS.

(No Model.) 2 Sheets—Sheet 2.
N. ARAVE.
Baling Press.
No. 242,580. Patented June 7, 1881.
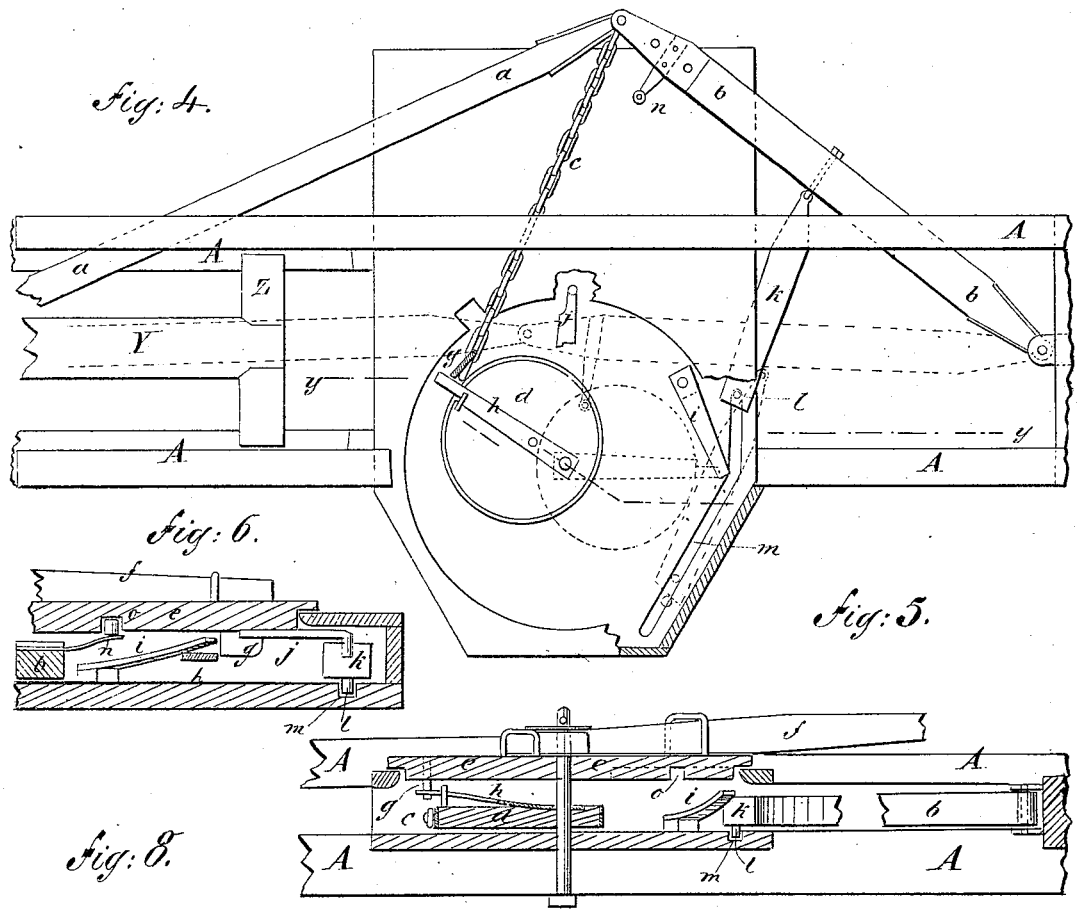
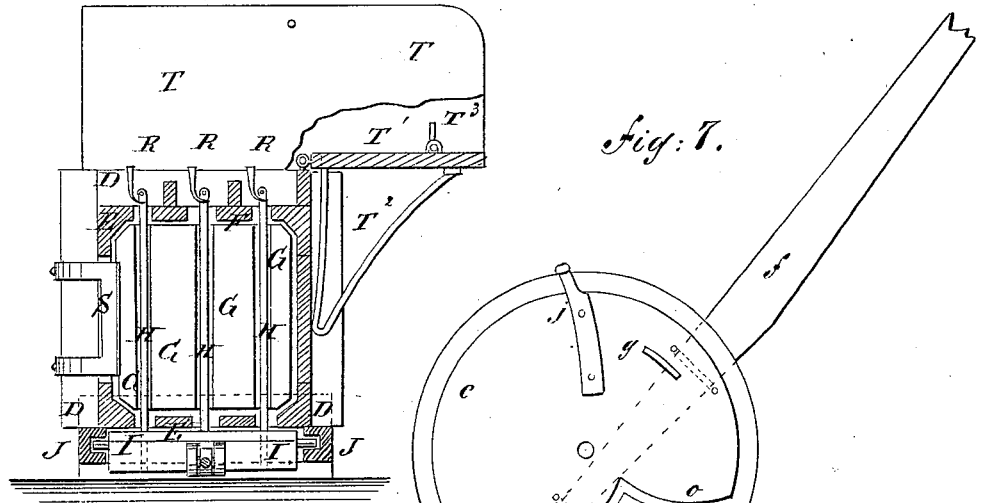
WITNESSES:
Chas. Nida
C. Sedgwick
INVENTOR:
N. Arave
BY Munn & Co
ATTORNEYS.

United States Patent Office.

NELSON ARAVE, OF HOOPER, UTAH TERRITORY.

BALING-PRESS.

SPECIFICATION forming part of Letters Patent No. 242,580, dated June 7, 1881.

Application filed January 20, 1881. (No model.)

*To all whom it may concern:*

Be it known that I, NELSON ARAVE, of Hooper city, in the county of Weber and Territory of Utah, have invented a new and useful Improvement in Baling-Presses, of which the following is a specification.

Figure 1, Sheet 1, is a plan view of my improvement. Fig. 2, Sheet 1, is a sectional side elevation of the same taken through the line $x$ $x$, Fig. 1. Fig. 3, Sheet 1, is a side elevation of the baling-box reversed. Fig. 4, Sheet 2, is a plan view of the driving mechanism, the sweep and drive-wheel being removed. Fig. 5, Sheet 2, is a sectional elevation of the driving mechanism taken through the line $y$ $y$, Fig. 4. Fig. 6, Sheet 2, is a sectional elevation of the driving mechanism, the parts being shown in position to release the eccentric and push out the toggle-joint. Fig. 7, Sheet 2, is an under-side view of the drive-wheel and sweep. Fig. 8, Sheet 2, is a sectional elevation of the baling-box, taken through the line $z$ $z$, Fig. 1.

Similar letters of reference indicate corresponding parts.

The object of this invention is to press hay and other materials in successive bales by the continuous forward movement of the driving mechanism.

The invention consists in the combination, with the baling-box and the slotted follower, of a set of needles attached to a sliding bar, operated by levers and carrying the binding-cords, whereby the cords are applied to a bale as it is being compressed by the follower; also, in the combination, with the baling-box, of springs to force down the ends of the hay and prevent the bale from expanding when the follower is withdrawn; also, in the combination, with the baling-box and the feed-spout, of the hinged apron, the hinged bars carrying the door and provided with brackets, and the cross-bar attached to the follower-bar, whereby the said door will be opened and closed by the movements of the follower.

The invention further consists in the combination, with the follower-bar and the sweep, of the toggle-bars, the eccentric connected with the toggle-bars by a chain, a plate attached to the sweep by a set of stops, and an arm and sliding bar, whereby the follower will be moved forward and back by the continuous forward movement of the driving-power; and also in the combination, with the toggle-bars and the sweep-plate having a curved groove in its lower side, of the arm attached to the toggle-bar, whereby the outward movement of the toggle-bars is controlled, as will be hereinafter fully described.

In the accompanying drawings, A represents the frame that carries the driving mechanism, which frame is designed to be mounted upon wheels B, so that it can be readily taken from place to place.

To the forward end of the frame A is bolted detachably the frame C, to which the frame D of the baling-box is attached. The bars of the frame D are connected by tie-bolts, so that the said frame can be expanded and contracted as larger and smaller bales are required.

The top and bottom parts of the baling-box casing E have longitudinal slots formed in them for the passage of the bale-cords F, so that the bales can be tied while in the baling-box.

The baling-box D is made without a head-block, and the follower G is slotted from its face to allow the curved needles H to pass through it to carry the cord up at the rear side of the bale. The needles H have eyes in their forward or upper ends, and their rear ends are formed upon or are rigidly attached to the shaft I, the journals of which work in grooves in the inner sides of bars J, attached to the lower side of the base-frame C.

To the bar or shaft I is pivoted the end of a connecting-rod, K, the other end of which is pivoted to the end of the lever L. The lever L passes through a slot in one of the bars J and is pivoted to the said bar.

To the outer end of the lever L is pivoted the end of a connecting-rod, M, the other end of which is pivoted to the lower end of the lever N. The lever N is pivoted to the baling-box frame D, and its upper end projects into such a position that it can be conveniently grasped and operated by an attendant standing at the side of the press.

The needles H pass between the bar O, attached to the bottom of the baling-box frame D, and the keeper or long staple P, attached to the said bar O, so that the said needles will be forced to pass up through the baling-box when the bar I is pushed forward. The bar O has perforations formed through it for the bale-cords F to pass through as the said cords are unwound from the spools Q, pivoted to the bottom of the baling-box frame D.

To the rear top bar of the baling-box frame D are attached catch-hooks R, which, when the needles H are forced upward, pass through the loops of the bale-cords F and hold the said cords against being drawn back by the descent of the said needles. To the rear part of the baling-box frame D are attached springs S, which project inward and forward to press down the ends of the hay and prevent the hay from springing back when the follower is withdrawn.

To the upper side of the rear end of the baling-box frame D is attached the feed-spout T, which projects at one side of the press, and is open at the top and at the projecting end. The bottom T' of the projecting part of the feed-spout T is hinged at its inner edge, so that it can be turned up into a vertical position to confine the hay beneath the door U. The bottom or apron T' is supported when in a horizontal position by a bracket, T², attached to it, and which rests against the side of the baling-box D E. The feed-opening of the baling-box D E is closed by the door U, which is attached to the forward ends of two bars, V. The bars V pass through slots in the rear side of the feed-spout T, and their outer ends are pivoted to the frame-work that guides the follower G as it moves in and out.

To the lower sides of the outer parts of the bars V are attached inclined arms or brackets W so that the said brackets W may be struck to raise the bars V and door U, as the follower moves forward, by a cross-bar, X, attached to the bar Y.

To the forward end of the bar Y is attached the follower G, and to the rear end of the said bar Y is attached a cross-head, Z, the ends of which slide in slots or grooves in the side bars of the frame A, so that the follower G will move in and out in a straight line. With the construction, as the follower G moves inward to press a bale the door U is raised to allow hay for another bale to be forced into the inner part of the feed-spout above the said follower. The apron T' is then raised into a vertical position by the attendant, where it is secured in place by a bolt or other fastening, T³, which fastening is arranged in such a position that it will be unfastened by the upward movement of the door U. As the follower G is drawn back the door U is drawn down by the movement of the said followers or descends by its own weight and presses the hay into the baling-box D E in front of the follower G, ready to be compressed by the said follower in its next forward movement. As each bale is forced into the baling-box it carries the cords F with it, so that the attendant has only to remove the cords from the catch-hooks R, tie the bale, cut the cords, and secure the ends, or hold them so that they will not be drawn into the baling-box by the advance of the next bale.

To a shoulder upon the upper side of the follower-bar Y is hinged the forward end of a bar, a, in such a manner that the rear end of said bar will have a horizontal movement.

To the rear end of the bar a is hinged the forward end of a bar, b, the rear end of which is hinged to the rear end of the frame A or to a support attached to the said frame, the bars a b thus acting as a toggle-joint in forcing the follower G forward.

To the joint of the bars a b is attached the end of a chain, c, the other end of which is attached to the rim of an eccentric wheel, d, at or near the end of the longest radius of the said wheel d. The eccentric is pivoted to the frame A or to a platform attached to the said frame A.

To the pivot of the eccentric d is pivoted a disk, wheel, or plate, e, to which is rigidly attached a sweep, f. To the under side of the plate e is attached a stop, g, to strike against a spring-stop, h, attached to the eccentric d in line with, or nearly in line with, its longest radius, the free end of the spring-stop h projecting a little beyond the rim of the said eccentric. With this construction, as the plate e is carried around by and with the sweep f the stop g strikes against the spring-stop h and the eccentric d is turned upon its pivot, winding the chain c around the face of the said eccentric, drawing the toggle-bars a b into line with each other, and forcing the follower G forward to compress a bale. As the toggle-bars a b come into line with each other the projecting end of the spring-stop h passes beneath the upwardly-inclined projecting end of the stop i attached to the frame A or to the platform to which the eccentric d is pivoted. The inclined stop i presses the free end of the spring-stop h downward and disengages it from the stop g, releasing the eccentric d. As the spring-stop h is withdrawn from the stop g the stop j, attached to the sweep-plate e, strikes against the inner end of a sliding bar, k, and pushes it outward. The outer end of the sliding bar k is hinged to the bar b so that the toggle-bars will be pushed outward and the follower G drawn back by the outward movement of the said sliding bar k.

To the lower side of the inner end of the sliding bar k is attached a pin, l, which enters and moves along a groove, m, formed in the platform to which the eccentric d is pivoted, to keep the sliding bar k in position as it moves out and in. The outer part of the guide-groove m is inclined forward to keep the stop j in contact with the end of the sliding bar k until the toggle-bars a b have been pushed out so far as to draw the follower G back the required distance. The outward movement of the toggle-bars a b draws the chain c outward, and thus turns the eccentric d back ready to be again turned forward, as hereinafter described.

To the outer toggle-bar, b, near its inner end, is attached the outer end of an inwardly-projecting arm, n, the inner end of which has an upwardly-projecting pin formed upon or attached to it, which enters a curved groove, o, in the under side of the sweep-plate e, and moves along the said groove o as the sweep-plate e revolves and the toggle-bars a b move in and out. The arm n and groove o control the movement of the toggle-bars a b and prevent them from being thrown out suddenly when the stop j strikes the end of the sliding bar k. The pin of the arm n may be provided with a tubular roller to lessen the friction between the said pin and the side of the groove o. With this construction the follower G will be moved in and out to press successive bales by the continuous advance of the driving-power.

Having thus described my invention, I claim as new and desire to secure by Letters Patent—

1. In a baling-press, the combination, with the baling-box D E and slotted follower G, of the needles H, the sliding bar, connecting-rod K, the levers L N, and the catch-hooks R, substantially as herein shown and described, whereby the cords are applied to the bale as it is being compressed by the said follower, as set forth.

2. In a baling-press, the combination, with the baling-box D E and the feed-spout T, of the hinged apron T', the hinged bars V, carrying the door U and provided with brackets W, and the cross-bar X, attached to the follower-bar Y, substantially as herein shown and described, whereby the said door U will be opened and closed by the movements of the follower, as set forth.

3. In a baling-press, the combination, with the follower-bar Y and the sweep f, of the toggle-bars a b, the chain c, the eccentric d, the stops g h i j, the sliding bar k, and the sweep-plate e, substantially as herein shown and described, whereby the follower will be moved forward and back by the continuous forward movement of the driving-power, as set forth.

4. In a baling-press, the combination, with the toggle bars a b and the sweep-plate e, having curved groove o, of the arm n, substantially as herein shown and described, whereby the outward movement of the toggle-bars is controlled, as set forth.

NELSON ARAVE.

Witnesses:
  J. R. MESSERVY,
  WM. MILLER.